United States Patent [19]

Vasishth et al.

[11] 4,285,997
[45] Aug. 25, 1981

[54] WOOD STABILIZING/TREATING COMPOSITIONS AND METHOD

[75] Inventors: Ramesh C. Vasishth, Danville, Calif.; Dodwell P. De Silva, Vancouver, Canada

[73] Assignee: Envirosol Systems International, Ltd., Orinda, Calif.

[21] Appl. No.: 91,029

[22] Filed: Nov. 5, 1979

[51] Int. Cl.$^3$ .............................................. B05D 3/02
[52] U.S. Cl. ............................. 427/393; 260/29.6 H; 427/440
[58] Field of Search .............................. 427/393, 440; 260/29.6 H, 29.6 Z, 29.6 N, 29.6 E

[56] References Cited

U.S. PATENT DOCUMENTS

| | | | |
|---|---|---|---|
| 2,591,768 | 4/1952 | Austin | 467/393 X |
| 3,647,516 | 3/1972 | Edwards | 427/393 X |
| 4,071,514 | 1/1978 | Ribbecke et al. | 260/22 M |
| 4,085,251 | 4/1978 | Rak | 427/393 X |
| 4,168,255 | 9/1979 | Lewis et al. | 427/393 X |

OTHER PUBLICATIONS

Smulski, Stephen, *Relationship of Water Borne Coatings & Grain-Raising in Wood*, Apr., 1978, pp. 1–8.
Vasishth, Ramesh C., *A New Approach to Wood Protection & Wood Coatings*, May, 1979, pp. 1–10.

*Primary Examiner*—Michael R. Lusignan
*Attorney, Agent, or Firm*—Townsend and Townsend

[57] ABSTRACT

A method for treating wood to enhance its properties comprising: contacting the wood to be treated with sufficient water dilutable resin formed from one or more vinyl monomers in a solvent consisting essentially of water to deposit an effective amount of said resin in the cell walls of said wood, said resin containing molecules of a size which can enter the free space in said cell walls in the presence of said solvent and having a minimum film forming temperature not greater than ambient, and converting the resin in said cell walls to a water insoluble form at ambient conditions. The treatment provides wood of improved dimensional stability and resistance to checking on exposure to water. Further improvements in the wood properties can be obtained by depositing additives such as water soluble preservatives or fire retardants in the cell walls of the wood and fixing the additives therein with the insolublized resin.

15 Claims, No Drawings

WOOD STABILIZING/TREATING COMPOSITIONS AND METHOD

This invention relates to the treatment of wood to enhance its properties. More particularly it relates to the impregnation of wood with resin and optionally with various additives such as preservatives and fire retardants.

The object of this invention is to produce a novel water based polymer composition optionally containing a high molecular weight film forming polymer and a substantial quantity of a low molecular weight fraction, the average molecular weight of the low molecular weight fraction being 1000 or less, the polymers or copolymers selected being such that on drying the mixture becomes substantially water insoluble, and at all times the entire coating composition being substantially free of organic solvents.

A further objective of the present invention is to modify the above polymer mixture by incorporating into the mixture one or more of a variety of wood treating organic and inorganic compounds to obtain a variety of coating and binder systems for specific applications.

A further objective of this invention is to produce a superior polymeric composition to enhance the dimensional stability of wood and in addition to deposit permanently chemical or chemicals into the wood structure to impart such desirable properties as fungal, mold, rot, insect resistance and fire retardancy.

Alkyds that are products of condensation polymerization contain polymer molecules having a broad range of molecular sizes. Solutions of alkyds in organic solvents, together with suitable driers, have long been used by the coating industry as binders. Alkyds can also be formulated such that they can be dissolved in a mixture of a strong water miscible organic solvents such as butyl cellosolve or butyl carbitol and water. To achieve this, alkyds are made to a relatively high acid number, generally in excess of 30, and then neutralized with ammonia, an amine or a combination of both.

The above coatings or solutions can be used to impart dimensional stability to wood. They can also be used to deposit permanently such chemicals as wood preservatives and fire retardants into the wood structure, thus further enhancing the life and usefulness of wood. Such utility for alkyds and other polymers is disclosed and claimed in copending patent application Ser. No. 91,030 filed Nov. 5, 1979. However, since these polymers are solubilized in water using a cosolvent such as butyl cellosolve or butyl carbitol, they suffer from some disadvantages.

Firstly, the cosolvents suitable to impart water dilutability to the polymer mixture are also good solvents for some of the dark colored chemicals naturally present in wood. Consequently, the application of these solutions to wood brings these dark colored compounds to the surface, darkening the wood and detracting from its natural beauty.

Most of the cosolvents are also good solvents for the cured alkyd resins. Consequently, even the fully cross-linked (cured) alkyl resins exhibit a great deal of water solubility until the cosolvent leaves the treated wood surface by evaporation. The low boiling cosolvents such as acetone, methyl ethyl ketone or lower alcohols also have a low flash point and are therefore hazardous to handle. They are also not sufficiently strong solvents for alkyds to be used alone. The high boiling solvents, on the other hand, are very slow to leave the treated wood. Thus, for example, when a block of wood approximately 2"×3"×3" is soaked in the above alkyd solution, even after subsequent air drying for several months the resin in the center of the block is still found to be water leachable. The time for complete drying is thus too long as a practical matter for some applications.

The water, water-miscible solvent, alkyd combination suffers from yet another disadvantage. If it is intended to use this mixture to permanently deposit water soluble chemicals such as wood preservatives or fire retardants into wood, the addition of these compounds to the mixture in effective amount separates the mixture into two layers, a resin cosolvent layer and a water-wood preservative and/or fire retardant layer. This excludes the use of these water soluble compounds to formulate a single mixture that can be used to treat wood to improve its dimensional stability and to deposit a wood preservative and a fire retardant into its woody structure. Consequently, the alkyd system is useful only when used in conjunction with chemicals that have a fair amount of solubility in the mixture, such as pentachlorophenol or fire retardants soluble in polar solvents. Such compounds are expensive compared to water soluble compounds, both inorganic and organic, and often times not as effective in like amounts.

It was at first thought that the real limitation to incorporating an additive, such as a wood preservative or a fire retardant, into this mixture containing an organic cosolvent was the solubility characteristics of the additive. Thus, borates have a limited solubility in water. Consequently, one would expect to incorporate only small quantities in the mixture. It was surprisingly found that this was not the only limitation, for even the addition of compounds with a large solubility in water in effective amounts resulted in phase separation—an organic phase and an aqueous phase.

Amine or ammonia neutralized water dilutable alkyds have different solubility characteristics depending upon the chemical composition of the alkyd. It was decided therefore to try alkyds that have greater solubility in water. However, these solutions too resulted in phase separation on the addition of the additives in quantities needed.

Further experimentation led to the surprising discovery that the amount of water soluble additive that can be incorporated into the mixture is related to the amount of cosolvent present in the mixture. The solubility of the alkyd is a factor only to the extent that different alkyds require different amounts of cosolvent to solubilize in water, thus defining the minimum amount of cosolvent needed in an alkyd solution. It was found that by reducing the amount of cosolvent in the above manner adequate quantities of some additives including wood preservatives and fire retardants singly or together could be incorporated into the mixture.

However, even the reduced amount of cosolvent in the mixture did not completely get rid of the other two problems, namely, the darkening of the wood due to the extraction of colored compounds to the surface of wood and the unacceptably long time needed to reach water insolubility of the polymer in the center of a fully treated piece of wood.

The present invention eliminates the use of organic cosolvents and thereby eliminates all of their attendant problems. Accordingly, the present invention provides a method for treating wood to enhance its properties comprising: contacting the wood to be treated with sufficient water dilutable resin formed from at least one vinyl monomer in a solvent consisting essentially of water to deposit an effective amount of said resin in the cell walls of said wood, said resin containing molecules of a size which can enter the free space in said cell walls in the presence of said solvent and having a minimum film forming temperature not greater than ambient, and converting the resin in said cell walls to a water insoluble form at ambient conditions. In the preferred embodiment the resin employed is a copolymer including an acrylic monomer.

Any polymer of copolymer formed from one or more vinyl monomers may be used provided that the polymeric resin has a minimum film forming temperature at or below ambient conditions. Otherwise an organic cosolvent is needed to obtain a useful film that is coherent and does not break up and powder due to excessive brittleness. To select a useful vinyl based resin it is simply necessary to apply a small amount to a suitable surface such as a glass plate and allow a film to form at ambient conditions. If the sample film is satisfactory the resin is useful in the present formulations.

Many acrylic polymers that are manufactured by free-radical polymerization have a narrow molecular weight distribution and the average size of the molecules is relatively large. Solutions of such resins are too viscous for convenient handling above 20 or 30% concentration. Consequently, they are manufactured by emulsion polymerization where the viscosity of the emulsion is independent of the molecular weight of the polymer. Because of their high molecular weight they are incapable of penetrating the wood cell walls even when the wood is in a swollen state.

These polymers and their emulsions have, however, some very distinct advantages, particularly in the context of the present application. The emulsions, for example, can be stable and yet contain no cosolvents, which cause limitations on the incorporation of additives as in alkyd solutions. Unlike the alkyds they do not yellow on aging. Since they form films by simple coalescence they are water resistant immediately after the water leaves the film.

Emulsions do tend to flocculate in the presence of inorganic water soluble salts. It was therefore a surprise to find that in effective concentrations of up to about five or ten percent, most water soluble wood preservatives and fire retardants could be added to most emulsions including polyvinyl acetate (PVA) PVA-acrylic and all acrylic emulsions without causing flocculation.

All attempts in the past to use acrylic polymers to stabilize wood have been made by impregnating the wood with a monomer and then subjecting the wood to heat or gamma rays to induce in situ polymerization. Such two step processes are expensive to carry out and cumbersome, and certainly are not usable for the consumer market.

Vinyl resins including acrylic polymers and homopolymers can also be produced in a low molecular weight range, yet, still with a narrow molecular weight distribution. Such polymers have been used as leveling aids in small quantities in floor polishes. For this purpose and the purpose of the present art they are manufactured with an excess of acid number, the polymer being subsequently dissolved in ammonical water. Amines and a combination of amine-ammonia may also be used.

Partially esterified rosin may also be similarly dissolved in ammonical water. They have molecular weights less than about 1000 and will therefore penetrate wood cell walls.

The above named low molecular weight polymers become water resistant, not by crosslinking further (curing) but by losing ammonia during drying.

By combining the above water dispersed low molecular weight polymers with the high molecular emulsions, it becomes possible to combine the various features which may be desired in a single solution and also, at the same time, eliminate the disadvantages inherent in a treating mixture containing substantial quantities of organic cosolvents.

For sometime now acrylic emulsions that appear water clear or transparent to the eye when their pH is adjusted to above 8.5 have been available. When the wood treating additives that may be used also yield colorless transparent solutions the use of these emulsions yield a transparent clear solution that has a special appeal to the consumer.

Polymers formed from vinyl monomers such as acrylic polymers, both copolymers and homopolymers are generally produced by reactions which result in a relatively narrow molecular weight distribution. As with the alkyd resins, the selected vinyl based resin should contain at least 5 weight percent of the resin molecules present having a molecular weight lower than about 1000 and preferably at least about 10 weight percent of resin molecules having a molecular weight below about 1000. In the preferred embodiment it is desired to have in the formulation sufficient larger molecules that cannot penetrate the wood cell wall and therefore form a protective and decorative outer surface coating. To this end the preferred formulations will usually involve combining two different vinyl polymers, one having the small molecules for penetration into the wood, and the other having relatively larger molecules for film forming on the surface of the wood. The larger molecules will generally have a molecular weight of about 20,000–200,000 with a typical formulation having 95% of the molecules in a molecular weight range of 90,000–110,000.

It has been found that most emulsions made by emulsion polymerization of vinyl containing monomers may be used to formulate the treating solution. Examples of monomers that contain a vinyl group are vinyl acetate, methyl methacrylate, ethyl ethacrylate, acrylamide, acrylonitrile, styrene, isoprene, and malic anhydride. These monomers may be polymerized by themselves to form homopolymers. Preferably, however, a judiciously selected mixture of monomers is used to control such properties as minimum film forming temperature, the hardness of the dried film, etc. The polymerization is generally carried out in the absence of oxygen using a free radical initiator such as a peroxide, the monomer or monomer mixture being suspended in water, by agitation and its temperature controlled above the temperature needed to decompose the initiator.

The low molecular weight polymers, either in the emulsion form or as clear solutions are synthesized much like the polymerization reaction described above, except that a suitable chain transfer ingredient is included in the reaction mixture.

Emulsion polymers having a large or small molecular weight, when made by using an acid, such as acrylic acid or methacrylic acid, or a mixture of such acids, as part of the monomer mixture, tend to form clear solutions when amines or ammonia are added to them to raise their pH to the alkaline side, generally above 8 or 8.5.

Although soluble in this form, when used as binders or film formers, they lose the ammonia or the volatile amine (if a volatile amine is used to adjust the pH) by evaporation and becomes water insoluble.

When a mixture of a high molecular weight polymer and a low molecular weight polymer are used, the low molecular weight polymer, together with water and the additives penetrate the wood cell walls and on the evaporation of water become deposited therein. The high molecular weight fraction is added to form a film on the outer surface, thus protecting it from the elements, and also adding an aesthetic appeal. The inclusion of this surface film former component also enables the addition to the treating solution of pigments, dyes, thickeners, flattening agents and extenders, both organic and inorganic, thus providing a wood treating and a wood coating or staining system in a single mixture. The weight ratio of high molecular weight resin to low molecular weight resin will generally be from 95:5 to 50:50 and more usually from about 90:10 to 70:30.

When such pigmented systems are used the pigments also serve as ultraviolet (UV) light absorbers. It is well known that UV light degrades wood. Consequently the inclusion of the pigment further serves to enhance the life of wood. In clear coatings the same objective can be achieved by the addition of UV absorbers known in the art for such purposes.

The present invention can be used in a variety of ways. For example, if it is desired to impart check resistance and dimensional stability to wood, a simple treatment with a solution of the present formulations followed by air drying may be sufficient. The amount of material deposited in the wood cell walls is proportional to the concentration of the material in the treating solution. This applies to the binder polymer as well as to other ingredients such as wood preservatives or fire retardants.

The amount of wood preservative or mixtures of wood preservatives used again depends upon the degree of protection desired. Typically, fire retardants or mixtures of fire retardants and preservatives may be used in concentration ranges of about 2 to 15 weight percent again depending upon the degree of protection needed.

The wood may be treated sequentially or concurrently with preservatives, fire retardants and resin binder. Where wood is first treated with fire retardant or wood preservative and then with the binder of the present system, higher levels of protection may be obtained than would be possible with a concurrent treatment. However, since water soluble additives are highly compatible with the present formulations, high levels of protection can usually be achieved in a concurrent treatment.

The resin binder and other wood treating chemicals may be contacted with the wood by any suitable technique. Conventional methods such as brushing, spraying, dipping, or subjecting the wood to vacuum followed by the treating solution under pressure at ambient or elevated temperature are all contemplated depending upon the wood and extent of penetration desired.

The following example illustrates formulation of the present invention including an acrylic resin having a molecular weight of less than about 1000 (Acrysol 527), as well as an acrylic resin of higher molecular weight whose molecules are too large to enter the wood cell wall. The formulation utilizes water as the sole solvent. Thus, suitable water soluble fire retardants and wood preservatives may be added to this formulation in effective concentrations without causing phase separation. In the formulation both the high molecular weight and low molecular weight resins have acid groups and are soluble in the aqueous ammonium hydroxide solvent providing a clear water white formulation.

EXAMPLE I

| Joncryl 678* | 18.00 |
| Acrysol 527** | 2.00 |
| Ammonium Hydroxide, 28% | 3.60 |
| Water | 76.40 |
| | 100.00 |

*Joncryl 678 is a water soluble acrylic resin manufactured by S. C. Johnson C., 100% n.v.
**Acrysol 527 is an all acrylic (low molecular weight) resin solution manufactured by Rohm & Haas Company, 45% n.v.
Total n.v. = 70%
J-678/AC-527 ratio = 90:10

As discussed previously, the work leading to the present invention revealed that the solubility characteristics of the wood treating additives in the solvent system was not the only limiting factor, but that the amount of organic cosolvent present in the system was directly related to the ability to dissolve water soluble additives in the system. In the table below various formulations are presented utilizing the water dilutable low molecular weight Acrysol 527 and high molecular weight E-1630 (an experimental acrylic emulsion manufactured by Rohm & Haas Company, n.v.=45%). Added to each formulation is a 10 percent by weight fire retardant produced by the complete neutralization of dimethylamine with phosphoric acid. Increasing concentrations of the organic cosolvent methyl carbitol are added. As indicated, when the methyl carbitol concentration reaches 10 percent by weight, phase separation occurs.

TABLE 1

| % of Acrysol 527 Resin Solids | % of E-1630 Resin Solids | % of Water | % of Methyl Carbitol | Compatability with 10% Fire Retardant |
| --- | --- | --- | --- | --- |
| 2 | 18 | 70 | 0 | Compatable |
| 2 | 18 | 68 | 2 | Compatable |
| 2 | 18 | 66 | 4 | Compatable |
| 2 | 18 | 64 | 6 | Compatable |
| 2 | 18 | 62 | 8 | Compatable |
| 2 | 18 | 60 | 10 | Not Compatable |
| 2 | 18 | 58 | 12 | Not Compatable |
| 2 | 18 | 10 | 60 | Not Compatable |
| 2 | 18 | 0 | 70 | Not Compatable |

We claim:
1. A method for treating wood to enhance its properties comprising: contacting the wood to be treated with sufficient water dilutable resin formed from at least one vinyl monomer in a solvent consisting essentially of water to deposit an effective amount of said resin in the cell walls of said wood, said resin containing molecules having a molecular weight of less than about 1000 and of a size which can enter the free space in said cell walls in the presence of said solvent in an amount sufficient to stabilize the wood, and having a minimum film forming temperature not greater than ambient, and converting the resin in said cell walls to a water insoluble form at ambient conditions.

2. A method in accordance with claim 1 wherein said resin is formed from an acrylic monomer.

3. A method in accordance with claim 1 wherein said resin comprises a film forming emulsion, water insolubilized by evaporation of solvent.

4. A method in accordance with claim 1 wherein said resin contains amine or ammonia neutralized acid groups for imparting water solubility thereto, volatilization of said amine or ammonia causing said resin to become water insoluble.

5. A method in accordance with claim 1 wherein said resin contains at least about 5 weight percent of molecules having a molecular weight of less than about 1000.

6. A method in accordance with claim 1 wherein said resin contains at least about 10 weight percent of molecules having a molecular weight of less than about 1000.

7. A method in accordance with claim 1 wherein said resin contains a substantial portion of molecules having a molecular size larger than can enter the free space in said cell walls and selected for forming a surface film on said wood.

8. A method in accordance with claim 7 wherein said molecules of larger molecular size have a molecular weight of about 20,000-200,000.

9. A method in accordance with claim 1 wherein said resin is present in the resin-solvent combination in a weight percent of about 5-70.

10. A method in accordance with claim 1 wherein said resin is present in the resin-solvent combination in a weight percent of about 5-30.

11. A method in accordance with claim 10 wherein said resin is present in the resin-solvent combination in a weight percent of at least about 8.

12. A method in accordance with claim 1 wherein an additional wood treating chemical in water solvent is contacted with said wood to deposit an effective amount of the chemical in the cell walls of the wood prior to converting the resin in the cell walls to a water insoluble form, and thereafter fixing the wood treating chemical in the cell walls by converting said resin to a water insoluble form.

13. A method in accordance with claim 12 wherein said wood treating chemical is present in the same water solvent as the resin and is concurrently contacted with the wood whereby wood treating chemical and resin are deposited in the cell walls together.

14. A method in accordance with claim 12 wherein said wood treating chemical is selected from wood preservatives and fire retardants.

15. A method in accordance with claim 14 wherein said wood treating chemical is a water soluble salt.

* * * * *